United States Patent Office 2,867,566
Patented Jan. 6, 1959

2,867,566

VETERINARY ORGANOTIN COMPOSITIONS

Elliott L. Weinberg, East Brunswick Township, Middlesex County, N. J., assignor to Metal and Thermit Corporation, Woodbridge Township, N. J., a corporation of New Jersey No Drawing. Application December 27, 1956
Serial No. 630,732

11 Claims. (Cl. 167—53.1)

The present invention relates to novel veterinary preparations useful in the treatment of poultry.

Poultry, and particularly chickens and turkeys, are susceptible to a host of diseases and infections which result in death, or in the production of poultry of inferior grade and having poor weight characteristics. Most important of these causative factors are coccidia, a microscopic protozoan parasite which causes coccidiosis, roundworms, chiefly represented by *Ascaridia galli* and related ascarids, and tapeworms, chiefly represented by *Raillietine cesticillus* and related cestodes. Numerous anthelmintic materials have been proposed as preventatives and/or cures of the various poultry infectations. Among the most effective of these are the diorganotin compounds, specified in U. S. Patent No. 2,702,775.

Anthelmintic materials are used in small regular dosages as a feed component to prevent and/or control the level of poultry diseases and infections. They are also used in larger dosages for curative purposes; such curative dosages usually being applied in capsule or tablet form. It is an advantage that the anthelmintic composition be a solid which is easily compounded in feed and/or medicinal formulations. Practical and useful anthelmintics must possess a high therapeutic index, i. e., a relative low toxicity at the effective anthelmintic dosage.

I have now discovered novel anthelmintic materials which are extremely effective and which are in a form convenient for compounding in feed and/or medicinal formulations.

It is an object of the present invention to provide anthelmintic materials.

Another object of the invention is to provide an effective taeniacide.

It is a further object of the invention to provide anthelmintic compositions having spectral activity against diseases and infections of poultry.

The invention further contemplates providing anthelmintic materials having a high therapeutic index.

Still another object of the invention is to provide anthelmintic compositions in a form so that they may be readily and effectively compounded in feed and medicinal formulations.

Other objects and advantages will become apparent from the following description.

Generally speaking, the present invention contemplates providing veterinary materials having as the active ingredient an effective amount of a complex amino-stannonium salt having the general formula: $[R_mSn(NZ)_y]X_{4-m}$, wherein $m$ is two or three, and $y$ is one or two; R is selected from the class consisting of alkyl groups having up to 22 carbon atoms in the chain, alkenyl groups having up to 22 carbon atoms in the chain, aralkyl groups having up to 22 carbon atoms in the alkyl chain, alkaryl groups having up to 22 carbon atoms in the alkyl chain, aryl groups (containing one or two aromatic rings) and heterocyclic groups; X is an electro-negative group; and NZ is a primary, secondary, or tertiary amine. $y$ is usually 2, but may be 1 when NZ is an amine containing two or more nitrogen atoms. The terms alkyl, aryl, heterocyclic, etc., include substituted hydrocarbon groups containing innocuous substituting groups.

The R groups attached to the tin atom may be the same or different and may be cyclized, condensed, or fused into rings. Illustrative $R_2Sn$ and $R_3Sn$ groups include dimethyltin, dibutyltin, tributyltin, dioctyltin, trioctyltin, dibutyloctadecyltin, pentamethylenetin, dicyclohexenetin, didodecyltin, triphenyltin, dibutylphenyltin, diisopropyltin, diisooctylbenzyltin, dinaphthyltin, dibenzyltin, di(phenylethyl)tin, trithienyltin, ditetrahydrofurfuryltin, ditolyltin, di(p-tert-butylphenyl)tin, trioleyltin, tripentenyltin, di(phenyloctyl)tin, divinyltin, trivinyltin, diallyl, dibutylvinyl dimethyloctyltin, butylvinyltin, divinyloctyltin, diphenylvinyltin, di-p-chlorophenyltin, di(monochloronaphthyl)tin, di(pentachlorophenyl)tin, di(octylphenyl)tin, tri(nonylphenyl)tin.

X is preferably selected from the class consisting of the halides (fluorides, chlorides, bromides and iodides); groups having the general formula $OR_a$; and groups having the general formula $SR_a$; wherein $R_a$ is selected from alkyl, alkenyl, aryl, aralkyl, alkaryl and acyl groups. Within the broader scope of the invention, it is contemplated that X may include any electro-negative group, or anionic radical. Illustrative X groups include mono-, di- and polycarboxylic acids, of the saturated or unsaturated types in substituted or unsubstituted form, such as acetic, lactic, stearic, maleic, malic, fumaric, citric, phthalic, benzoic, etc., acids and the esters of such acids. Other illustrative X groups include butoxy, lauroxy, phenoxy, and the sulfur analogs thereof, and compounds wherein the $R_a$ group is illustrated by the R groups listed hereinbefore. X also includes such other sulfur derivatives of the mercaptans and mercaptoacid esters as α-mercaptolauric acid, mercaptoethanol, isooctylmercaptoacetate, laurylmercaptan, etc. X may also include such derivatives as the benzene sulfonates, the sulfonamides, the dithiocarbamates, the isodithiocarbamates, and the xanthates.

The NZ groups are primary, secondary, or tertiary amines, and include as amines those heterocyclic compounds containing one or more nitrogen atoms in the ring structure. The following are illustrative of suitable amines: (*a*) Primary amines, such as octyl amine, lauryl amine, stearyl amine, oleyl amine, cyclohexyl amine, benzyl amine, aniline, p-phenylene diamine, and their analogues and homologues, and the alkanolamines of this class. (*b*) Secondary amines (including the heterocyclic nitrogen compounds which have a secondary amine structure) such as dioctyl amine, dicetyl amine, dilauryl amine, dodecylmethyl amine, dicyclohexyl amine, methyl aniline, piperidine, morpholine, piperazine, phenothiazine, and the like, and the alkanolamines of this class. (*c*) Tertiary amines such as tripropyl amine, dimethyl benzyl amine, trilauryl amine, pyridine, dimethyl lauryl amine, dimethyl aniline, methyldicyclohexyl amine, quinoline, 8-hydroxyl quinoline, glyceryl diethylamine, cyclohexyldiethylamine, and the alkanolamines and acid amines of this class and the analogues and homologues.

The amino-stannonium complexes are prepared by reacting an organotin compound having the general formula $R_2SnX_2$ or $R_3SnX$ with a desired amine, preferably with agitation. The reaction is usually exothermic and often initiates immediately upon mixing. In certain cases, the reactants must be heated before the reaction initiates. The amino-stannonium complexes are usually solids. A typical preparation of these complexes is illustrated by the preparation of solid bis-(piperazino)-dibutylstannonium dilaurate by mixing two moles of piperazine with one mole of dibutyltin dilaurate. The material was agitated and an exothermic reaction occurs, yielding the desired product.

Illustrative complexes prepared in this manner (only some requiring initial heating) include, mono-(piperazino)dibutylstannonium diacetate, mono-(2-methylpiperazino)dibutylstannonium diacetate, mono-(2,5-dimethylpiperazino)dibutylstannonium diacetate (cis isomer), mono-(2,5-dimethylpiperazino)dibutylstannonium diacetate (trans isomer), mono-(piperazino)dibutylstannonium dichloride, mono-(2,5-dimethylpiperazino)dibutylstannonium dichloride (cis isomer), mono-(piperazino)dibutylstannonium dilaurate, mono-(2-methylpiperazino)dibutylstannonium dilaurate, mono-(2,5-dimethylpiperazino)dibutylstannonium dilaurate (cis isomer), mono-(2,5-dimethylpiperazino)dibutylstannonium dilaurate (trans isomer), bis-(morpholino)tributylstannonium chloride, bis-(piperidino)tributylstannonium chloride, bis-(piperazino)dibutylstannonium diacetate, bis-(2-methylpiperazino)dibutylstannonium diacetate, bis-(2,5-dimethylpiperazino)dibutylstannonium diacetate (cis isomer), bis-(2,5-dimethylpiperazino)dibutylstannonium diacetate (trans isomer), bis-(morpholino)dibutylstannonium diacetate, bis-(piperidino)dibutylstannonium diacetate, bis-(piperazino)dibutylstannonium dichloride, bis-(2,5-dimethylpiperazino)dibutylstannonium dichloride (cis isomer), bis-(morpholino)dibutylstannonium dichloride, bis-(piperidino)dibutylstannonium dichloride, bis-(piperazino)dibutylstannonium dilaurate, bis-(2-methylpiperazino)dibutylstannonium dilaurate, bis-(2,5-dimethylpiperazino)dibutylstannonium dilaurate (cis isomer), bis-(2,5-dimethylpiperazino)dibutylstannonium dilaurate, (trans isomer), bis-(morpholino)dibutylstannonium dilaurate, bis-(piperidino)dibutylstannonium dilaurate, bis-(morpholino)triethylstannonium chloride, bis-(piperidino)triethylstannonium chloride, bis-(dilaurylamino)triphenylstannonium chloride, bis-(diethylamino)dibutylstannonium dichloride, mono-(N,N'-diphenyl-p-phenylenediamino)diphenylstannonium dichloride, bis-(2-methylpiperazino)dibutylstannonium diacetate, bis-(phenothiazino)dibutylstannonium dichloride, bis-(dilaurylamino)dibutylstannonium dilaurate, bis-(phenothiazino)dibutylstannonium diacetate.

Other illustrative compounds include, mono-(mixed hexadecl-octadecylamino)dioctylstannonium dibutoxide, bis-(anilino)tricresylstannonium lauryl mercaptide, bis-(dicyclohexylamino)divinylstannonium S,S'bis-(isooctylmercaptoacetate), mono-(oleylamino)dimethyloctylstannonium dimethyl dithiocarbamate, mono-(octylamino)-butylvinylstannonium di-p-toluenesulfonamide, bis-(benzylamino)di-p-chlorophenylstannonium S,S'bis-(mercaptoethyllaurate), bis-(tributylamino)diallylstannonium dibenzenesulfonate, bis-(8-hydroxyquinolino)trioctylphenylstannonium citrate, bis-(pyridino)diquinolylstannonium maleate, bis-(piperazino)dithienylstannonium dilaurylmercaptide, mono-(2-methylpiperazino)tritetrahydrofurfurylstannonium laurate, bis-(piperazinotributylstannonium acetate, bis-(piperazino)tributylstannonium laurate, bis-(piperazino)tributylstannonium chloride, bis-(piperazino)triphenylstannonium acetate, bis-(piperazino)triphenylstannonium laurate, bis-(piperazino)triphenylstannonium chloride, bis-(phenothiazino)dibutylstannonium diacetate, bis-(phenothiazino)dibutylstannonium dilaurate, bis-(phenothiazino)dibutylstannonium dichloride, bis-(phenothiazino)tributylstannonium acetate, bis-(phenothiazino)tributylstannonium laurate, bis-(phenothiazino)tributylstannonium chloride, bis-(phenothiazine)triphenylstannonium acetate, bis-(phenothiazine)triphenylstannonium laurate, bis-(phenothiazine)triphenylstannonium chloride, bis-(dilaurylamino)dibutylstannonium diacetate, bis-(dilaurylamino)dibutylstannonium dilaurate, bis-(dilaurylamino)dibutylstannonium dichloride, bis-(dilaurylamino)tributylstannonium acetate, bis-(dilaurylamino)tributylstannonium laurate, bis-(dilaurylamino)tributylstannonium chloride, bis-(dilaurylamino)triphenylstannonium acetate, bis-(dilaurylamino)triphenylstannonium laurate, bis-(dilaurylamino)triphenylstannonium chloride, mono-(2,5-dimethylpiperazino)dibutylstannonium diacetate (cis), mono-[N,N'-bis(4-nitrophenyl)piperazino]tricresylstannonium butoxide, bis-(N,N'-dichloropiperazino)triallylstannonium diethyl isodithiocarbamate, bis-(phenothiazino)dibutylstannonium dichloride, bis-(phenothiazino)tributylstannonium chloride, bis-(phenothiazino)tributylstannonium acetate, bis-(phenothiazino)tributylstannonium laurate, bis-(phenothiazino)triphenylstannonium laurate, bis-(phenothiazino)triphenylstannonium acetate, bis-(phenothiazino)triphenylstannonium chloride, bis-(phenothiazino-9-oxide)dioctylstannonium S,S'bis(issoctylmercaptoacetate), bis-(2,4,5,7-tetrachloro-phenothiazino)triallylstannonium maleate, bis-(10-benzoyl-phenothiazino)dibutylstannonium di(laurylmercaptide), bis-(10-methyl-2,7-dinitro-phenothiazino-9-oxide)dinaphthylstannonium dioleate.

The anthelmintic and taeniafuge effectiveness of the amino-stannonium complexes is illustrated in the following tests.

Chickens were artificially infected with a large number of tapeworms, *Raillietina cesticillus*, using the following procedure: Mature tapeworm proglottids recovered from droppings of birds were fed to grain beetles, *tribolium confusum*. After an incubation period of three weeks, a selected number of beetles containing cysticercoids were fed to healthy white leghorn pullets, weight range of 352 to 864 grams. Following infection, the birds were individually housed in wire mesh cages elevated above the droppings. The birds were observed for thirty-four days. Beginning on the twentieth post-infection day, droppings from each bird were examined every one or two days until proglottids were found. Observations throughout the test were made for general health, body weight, and mortality.

Groups of three or four birds each were established. A control group received no treatment, but was fed a methyl cellulose vehicle. The anthelmintic materials were administered to the birds as a 2% weight/volume suspension prepared using a 0.5% weight/volume aqueous solution of methyl cellulose as a vehicle. The dosage of methyl cellulose solution administered to the negative control birds (Group 1) corresponded to the maximum volume of material administered to any bird of the remaining groups. Birds in the three remaining groups each received a single oral dose of one of the three amino-stannonium complexes as noted in the table below.

| Group No. | Number of birds | Material | Dose | |
|---|---|---|---|---|
| | | | Ml. | mg./kg. |
| 1 | 3 | 0.5% aqueous w./v. solution of methyl cellulose. | 17.2 | |
| 2 | 4 | bis-(piperazino)dibutylstannonium dilaurate. | | 95 |
| 3 | 4 | bis-(phenothiazino)dibutylstannonium dilaurate. | | 125 |
| 4 | 3 | bis-(dilaurylamino)dibutylstannonium dichloride. | | 270 |

The birds were observed for gross signs of systemic toxicity at frequent intervals during the day of administration of the test materials and daily thereafter for a period of nine days. At the end of the observation period, each test bird was sacrificed by exsanguination, and a gross autopsy was performed. The gastrointestinal tract was removed, cut into sections each about six inches in length, opened, and examined under water for the presence of tapeworms or other macroscopic parasites.

Each control and experimental bird exhibited a normal increase in body weight during the post-treatment interval. At gross autopsy, the organs of each control and experimental bird were within normal limits. No gross pathology was observed which could be attributed either to administration of the respective compounds tested or to the presence of *R. cesticillus*. Examination showed that the intestinal tract of the control birds contained tapeworms, and that the anthelmintic materials containing the amino-stannonium complexes effectively removed tapeworms from the intestinal tracts of the treated birds. Examination further indicated that the anthelmintic materials were well-tolerated by the birds, and little or no gross evidence of ill effects was observed.

It is known that triphenyltin chloride is an effective agent for expelling worms from fowls. However, at the dosage level used for anthelmintic effectiveness, it has been found to be toxic to the fowl. One of the most effective of the known anthelmintic materials, dibutyltin dilaurate, is active against a wide range of poultry parasites and diseases. However, it is usually used as an ingredient of feed formulations or of medicinal formulations which also contain other active ingredients. The amino-stannonium complexes prepared from diorganotin and triorganotin compounds exhibit a high anthelmintic effectiveness with a concomitant high therapeutic index. They are effective as ingredients of feeds or as medicants without the necessity of compounding with other anthelmintic materials. They are usually solids and are easily compounded in poultry feeds and medicines. They do not have the bad odor characteristics associated with many of the tetravalent diorganotin compounds. Feeds containing as little as 0.005% of the anthelmintic compound are effective to prevent the infection of poultry. Medicinal compositions are usually prepared by compounding the anthelmintic with diluent and/or inert materials such as talcum, stearic acid, stearates, gums, lactose, corn starch, methyl cellulose, etc. The minimum effective amount for anthelmintic purposes both in feeds and in medicants (usually tablet form) varies in accordance with the age, weight and type of poultry. Due to the high therapeutic index of anthelmintics of the present invention it is possible to safely use a relatively large dosage and secure effective protection or treatment.

As many embodiments of this invention may be made without departing from the spirit and scope thereof, it is to be understood that the invention includes all such modifications and variations as come within the scope of the appended claims.

I claim:

1. A veterinary compostion effective in the control of parasites in fowl selected from the class consisting of coccidia, ascarids and cestodes comprising an orally ingestible vehicle containing a small but effective non-toxic amount of a compound having the general formula $[R_mSn(NZ)_y]X_{4-m}$, wherein $m$ is a whole number from 2 to 3; $y$ is a whole number from 1 to 2; R is a group selected from the class consisting of lower alkyl and phenyl groups; NZ is an amino group selected from the class consisting of piperazines, phenothiazines and alkyl amines having from 1 to 12 carbon atoms; and X is a pharmaceutically acceptable electronegative group; said compound being present in an amount not less than 0.005% by weight of the composition.

2. A composition as defined in claim 1 in which $y$ is 2.

3. A composition as defined in claim 1 in which X is selected from the class consisting of chlorine and the laurate and acetate groups.

4. A composition as defined in claim 3 in which $y$ is 2, $m$ is 2, and the R group is the butyl group.

5. A composition as defined in claim 2 in which $y$ is 2, $m$ is 3, and the R group is the phenyl group.

6. A composition as defined in claim 1 in which the compound is bis - (dilaurylamino)triphenylstannonium chloride.

7. A composition as defined in claim 1 in which the compound is mono - (diethylamino)dibutylstannonium diacetate.

8. A composition as defined in claim 1 in which the compound is bis - (dilaurylamino)dibutylstannonium dichloride.

9. A composition as defined in claim 1 in which the compound is bis - (dilauyrlamino)dimethylstannonium dilaurate.

10. A composition as defined in claim 1 in which the compound is bis - (dibutylamino)diphenylstannonium dilauryl-mercaptide.

11. A process for controlling parasites selected from the class consisting of coccidia, ascarids and cestodes by administering to fowl an effective but non-toxic amount of a compound having the general formula $[R_mSn(NZ)_y]X_{4-m}$, wherein $m$ is a whole number from 2 to 3; $y$ is a whole number from 1 to 2; R is a group selected from the class consisting of lower alkyl and phenyl groups; NZ is an amino group selected from the class consisting of piperazines, phenothiazines and alkyl amines having from 1 to 12 carbon atoms; and X is a pharmaceutically acceptable electronegative group.

References Cited in the file of this patent

UNITED STATES PATENTS

| | | |
|---|---|---|
| 2,630,436 | Church | Mar. 3, 1953 |
| 2,702,775 | Kerr et al. | Feb. 22, 1955 |

OTHER REFERENCES

Urbain: Comptes Rendes, vol. 205, pages 460–62 (1937).

Kenney et al.: Chem. Abs., vol. 49, page 15152 (1955).